(12) United States Patent
Houston et al.

(10) Patent No.: US 8,825,597 B1
(45) Date of Patent: Sep. 2, 2014

(54) NETWORK FOLDER SYNCHRONIZATION

(75) Inventors: Drew Houston, San Francisco, CA (US); Arash Ferdowsi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 271 days.

(21) Appl. No.: 12/856,581

(22) Filed: Aug. 13, 2010

Related U.S. Application Data

(60) Provisional application No. 61/233,773, filed on Aug. 13, 2009, provisional application No. 61/233,787, filed on Aug. 13, 2009.

(51) Int. Cl.
*G06F 17/00* (2006.01)
*G06F 17/30* (2006.01)
*H04L 29/08* (2006.01)

(52) U.S. Cl.
CPC ...... *H04L 67/1095* (2013.01); *G06F 17/30067* (2013.01); *G06F 17/30174* (2013.01)
USPC ............................. 707/610; 707/624; 707/625

(58) Field of Classification Search
None
See application file for complete search history.

(56) References Cited

U.S. PATENT DOCUMENTS

| | | | | |
|---|---|---|---|---|
| 6,865,599 B2 * | 3/2005 | Zhang | | 709/218 |
| 7,587,501 B2 * | 9/2009 | Stillion et al. | | 709/229 |
| 7,822,793 B2 * | 10/2010 | Rawat et al. | | 707/828 |
| 8,055,644 B2 | 11/2011 | Crowley et al. | | |
| 8,095,495 B2 * | 1/2012 | Clark et al. | | 706/48 |
| 8,156,074 B1 * | 4/2012 | Multer et al. | | 707/610 |
| 8,443,040 B2 * | 5/2013 | Schauser et al. | | 709/204 |
| 8,554,791 B1 * | 10/2013 | Lavin | | 707/781 |
| 2004/0039781 A1 * | 2/2004 | LaVallee et al. | | 709/205 |
| 2004/0210591 A1 * | 10/2004 | Hirschfeld et al. | | 707/100 |
| 2005/0044162 A1 * | 2/2005 | Liang et al. | | 709/212 |
| 2005/0246389 A1 * | 11/2005 | Shah et al. | | 707/200 |
| 2006/0117056 A1 * | 6/2006 | Havewala et al. | | 707/102 |
| 2006/0184652 A1 * | 8/2006 | Teodosiu et al. | | 709/221 |
| 2006/0224602 A1 * | 10/2006 | Rawat et al. | | 707/100 |
| 2007/0100834 A1 * | 5/2007 | Landry et al. | | 707/10 |
| 2007/0174246 A1 * | 7/2007 | Sigurdsson et al. | | 707/3 |
| 2009/0254601 A1 * | 10/2009 | Moeller et al. | | 709/201 |

OTHER PUBLICATIONS

A. Howe. Napster and Gnutella: a Comparison of two Popular Peer-to-Peer Protocols. University of Victoria. Feb. 28, 2002. pp. 1-29.*

* cited by examiner

*Primary Examiner* — Polina Peach
(74) *Attorney, Agent, or Firm* — Fenwick & West LLP

(57) ABSTRACT

Synchronization of folders shared among multiple clients over a network is provided. A first user of a first client instantiates a folder to be shared, and the folder and its contents are synchronized with a host system. As the user makes changes to the folder and its contents on the first client, those changes are propagated to the synchronized version on the host server. Other clients who will be sharing the synchronized folder register with the host system and obtain a current version of the synchronized folder and contents. As the contents of the synchronized folder are changed by any of the clients, the changes are propagated to the host system, which in turn delivers the changes to each of the clients registered as sharing that folder. In this way, each client participating in the share has a current version of the folder and its contents.

8 Claims, 9 Drawing Sheets

NETWORK FOLDER SYNCHRONIZATION

CROSS REFERENCE TO RELATED APPLICATIONS

This application claims the benefit of U.S. Provisional Application Nos. 61/233,773, filed on Aug. 13, 2009, and 61/233,787, filed on Aug. 13, 2009, each of which is incorporated by reference herein in its entirety.

BACKGROUND

1. Field of the Invention

The present invention relates generally to sharing of data over a network. In particular, the present invention is directed to synchronization of a folder and its contents shared between multiple clients.

2. Description of Related Art

People often use multiple computers on a regular basis. A typical user may have a first computer at the office and a second computer at home, for example. Sharing documents between these multiple computers generally requires transferring the document from one to the other—for example, a user may e-mail himself a copy of a document he is working on before leaving the office, so that he can resume working on it later from home. If the user forgets to e-mail or bring the document home with him, he must either go back to the office to retrieve it, or perhaps give up until the morning. Some methods exist to allow remote access to a computer, for example using a virtual private network (VPN) to access a corporate network from a remote location. However, if the user is accessing the document remotely and loses his connection, he may lose his changes, be unable to continue, and may end up with a corrupted document.

In addition, a dramatic increase in telecommuting and decrease in business travel has led to the need for people to collaborate on files from locations remote from each other. This results in the passing of documents back and forth, for example as e-mail attachments or through instant messaging file transfers. Not only is attaching files cumbersome for many computer users, but where multiple iterations are involved, it is not difficult to end up with multiple versions of the same document, perhaps having the same or a similar file name, located in various places on a user's hard drive. Worse still, two or more people may be editing local versions of a document on their own computers, resulting in multiple different current versions of a document than then have to be painstakingly integrated to produce a usable version.

SUMMARY

The present invention enables synchronization of folders shared among multiple clients over a network. A first user of a first client instantiates a folder to be shared, and the folder and its contents are synchronized with a host system. As the user makes changes to the folder and its contents on the first client, those changes are propagated to the synchronized version on the host server. Other clients—which may be, for example, additional computer systems operated by the first user, or computer systems operated by multiple other users—who will be sharing the synchronized folder register with the host system and obtain a current version of the synchronized folder and contents. As the contents of the synchronized folder are changed by any of the clients, the changes are propagated to the host system, which in turn delivers the changes to each of the clients registered as sharing that folder. In this way, each client participating in the share has a current version of the folder and its contents.

In various embodiments, historic versions of shared folders are retained, thus allowing users to examine and restore earlier versions as desired. In addition, conflict resolution is provided, enabling users to work on shared folders even when not connected to the network; when a connection is available, a conflict resolution check occurs to ensure that changes made by the offline user do not overwrite changes made by other users during the period the offline user was offline. In various embodiments, a web interface allows access to shared folders from any computer with network access.

Changes to files are propagated to and from the host system by transferring only sets of blocks of a file that have undergone changes. This reduces network utilization and allows synchronization to proceed without interrupting the user's experience, while enabling the user to work on a file that is at all times local to his client.

DETAILED DESCRIPTION

System Architecture

Figure 1:
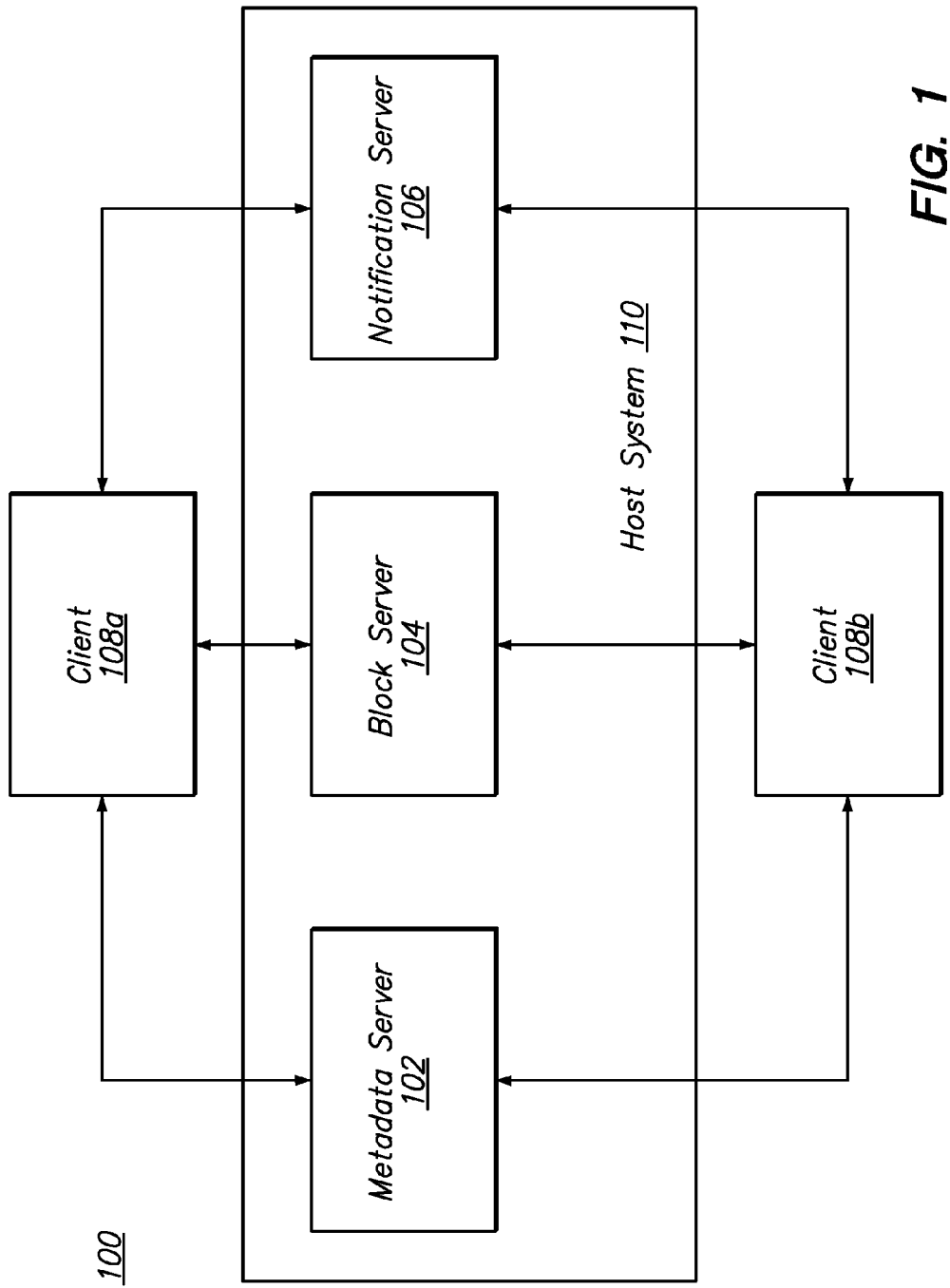
FIG. 1 is a block diagram of a host system and clients for maintaining synchronized shared folders in accordance with an embodiment of the present invention.

FIG. 1 is a block diagram of a host system and clients for maintaining synchronized shared folders in accordance with an embodiment of the present invention. System 100 includes a host system 110 and clients 108a, 108b. Host system 110 further includes a metadata server 102; a block server 104; and a notification server 106.

Metadata server 102 receives requests from clients to update the server's copy of synchronized folders and provides clients with a list of metadata for files being synchronized. Block server 104 receives, stores, and serves blocks of data constituting synchronized files. Notification server 106 provides updates to clients when a synchronized folder has been updated on the server, and provides those notifications to the clients. The operation of each of these components is described further below.

Note that in various embodiments, sharing occurs at the folder level—that is, a folder and any files in that folder are shared among clients, and kept synchronized by the clients and host system 110. Throughout this description therefore, we refer to both folders and files as being synchronized and shared.

Client 108 may be a personal computer such as a desktop or laptop computer, a mobile device, or any other computer system having a file system. Client 108 executes an operating system such as Microsoft Windows, Mac OS, Unix, etc., and includes memory, storage, a network interface, and other conventional computer hardware not illustrated in FIG. 1 for clarity. Client 108 creates, modifies and deletes files on its storage system in a conventional manner via its operating system, with the modifications described here. In addition, and as described further below, client 108 includes one or more synchronized folders. In FIG. 1, only two clients 108*a* and 108*b* are shown, but any number of clients 108 may be sharing synchronized folders via host system 110.

Figure 2:
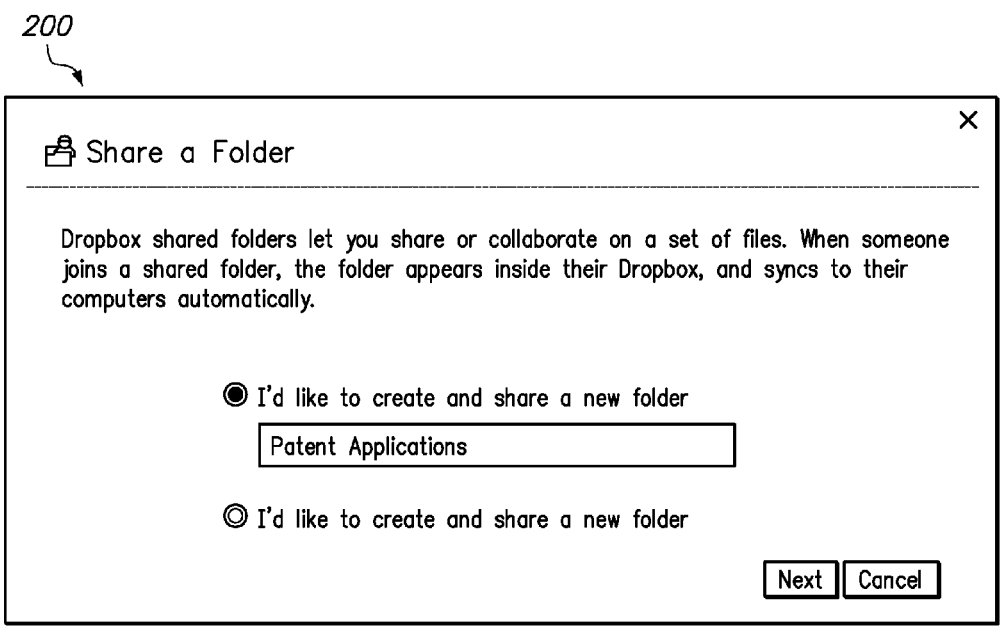
FIG. 2 illustrates a user interface window for creating a shared synchronized folder in accordance with an embodiment of the present invention.
Figure 3:
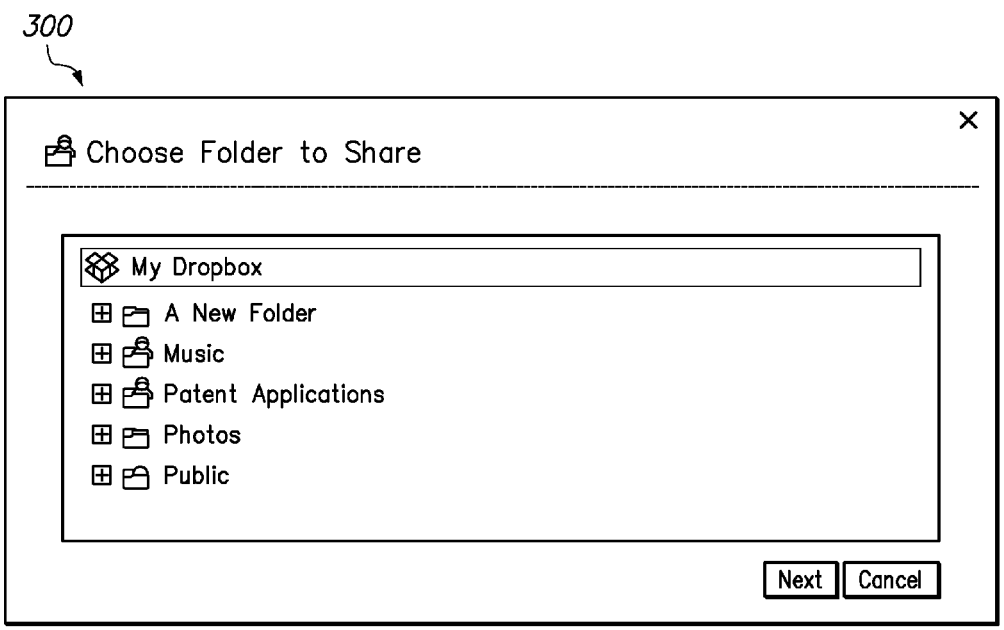
FIG. 3 illustrates a user interface window for creating a shared synchronized folder in accordance with an embodiment of the present invention.
Figure 4:
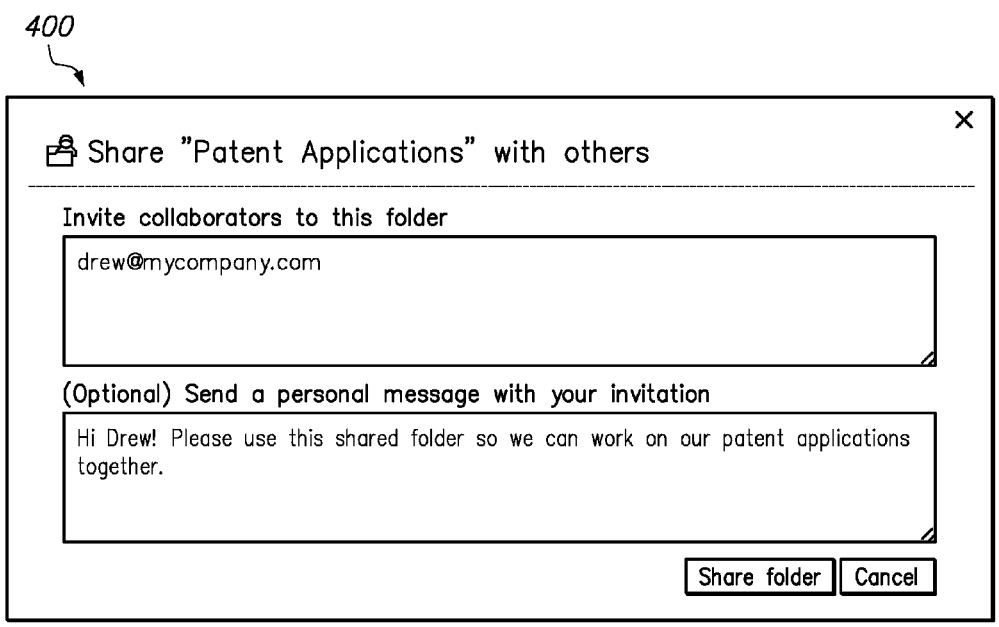
FIG. 4 illustrates a user interface window for sharing a folder in accordance with an embodiment of the present invention.
Figure 10:
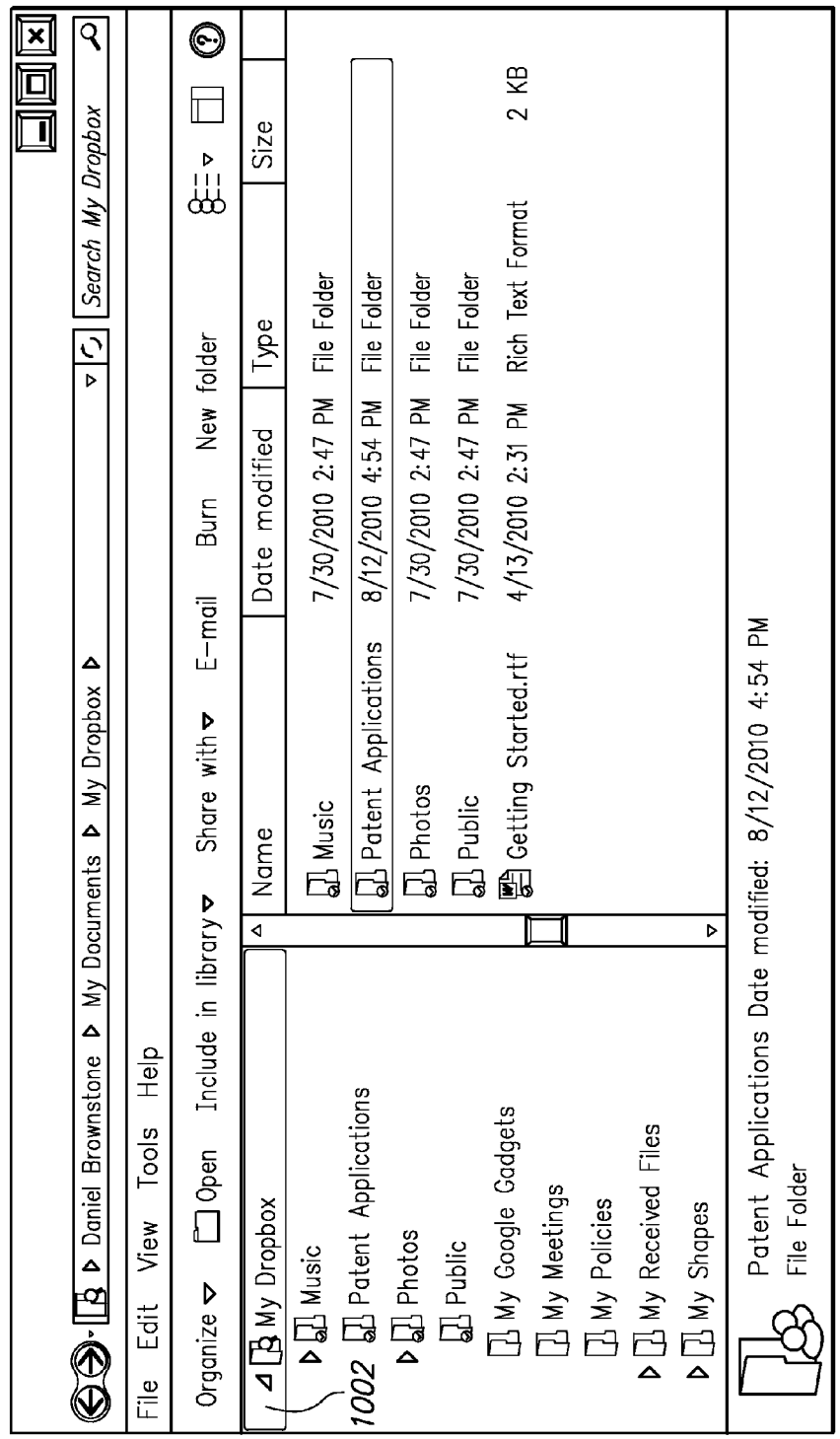
FIG. 10 illustrates an interface for interacting with shared folders in accordance with an embodiment of the present invention.
Figure 11:
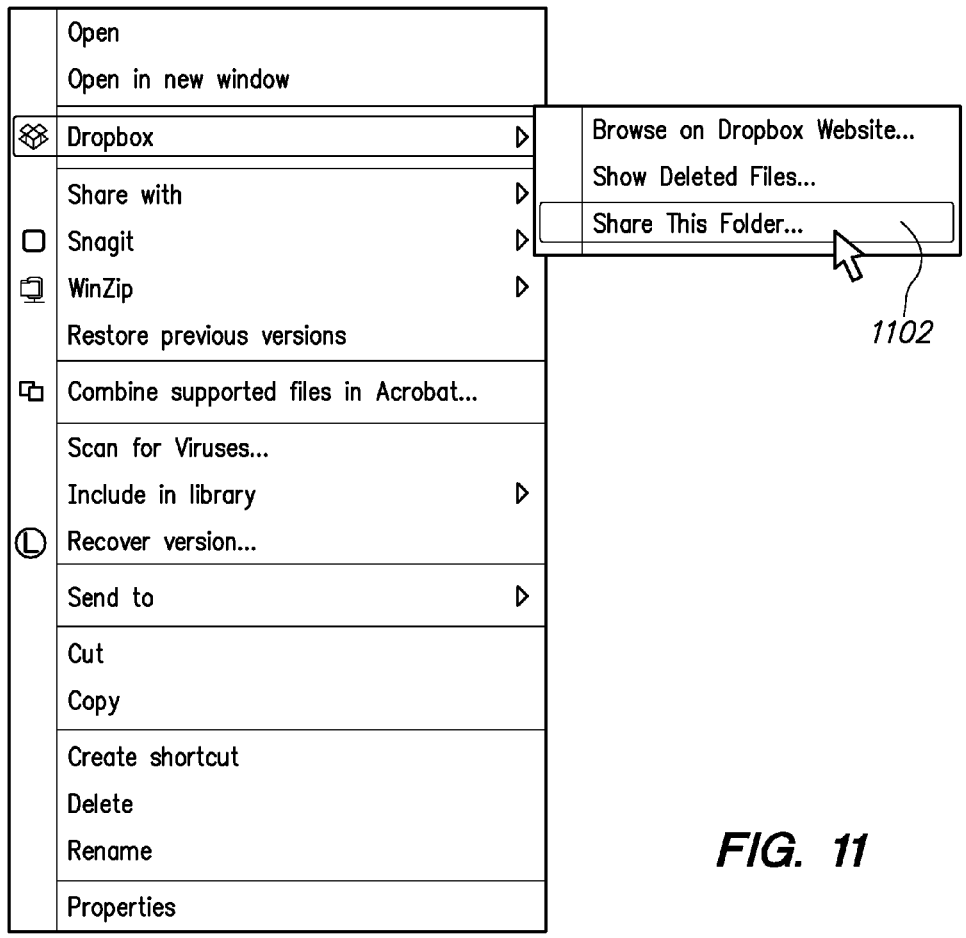
FIG. 11 illustrates a selection menu for sharing a folder in accordance with an embodiment of the present invention.

Client 108 enables a user to create, modify and delete files on the client's local file system, and for those actions to be synchronized with versions of the same files on host system 110 and on one or more other client computers. In one embodiment, a user creates a folder and designates it as one that should be synchronized, and its contents are then managed by client 108 to maintain that synchronization. In one embodiment, a user can create a shared synchronized folder either through a user interface portion of client 108, or via a web server. FIG. 2 illustrates a user interface window 200 accessed via a web interface. A user in the illustrated embodiment has an option to either create a new folder or share an existing folder. In FIG. 2, the user has chosen to create a new folder called "Patent Applications." Conversely, FIG. 3 illustrates a user interface window 300 that enables a user to select from among existing folders to be shared. Once the user has chosen or created the folder to be shared, FIG. 4 illustrates a user interface window 400 via which the user can invite those people with whom he would like to share the folder. FIG. 10 and FIG. 11 provide a view of how a folder can be shared using software on client 108. FIG. 10 and FIG. 11 are described further below with respect to namespaces.

Figure 5:
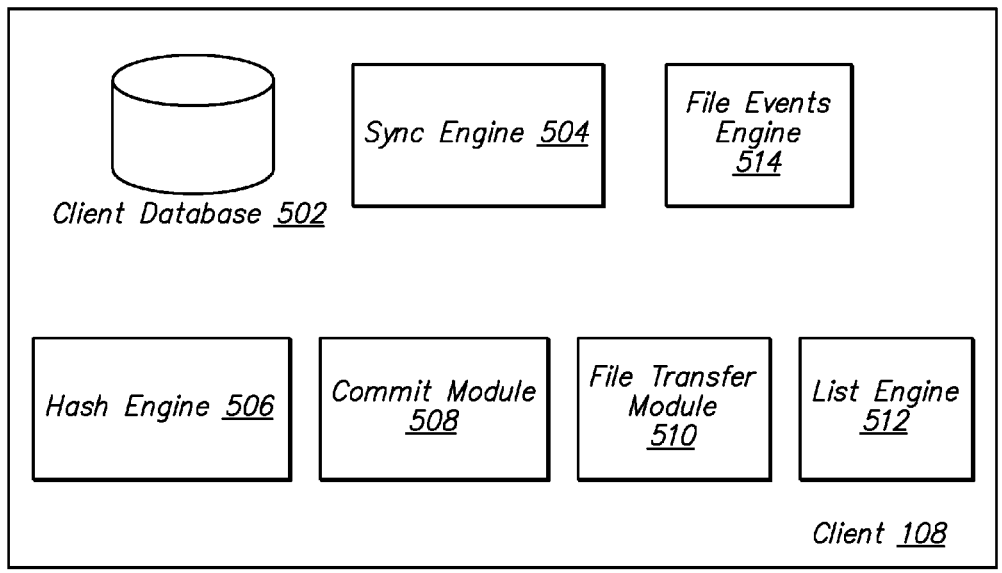
FIG. 5 is a block diagram of a client system for maintaining synchronized shared folders in accordance with an embodiment of the present invention.

FIG. 5 is a block diagram providing a more detailed view of client 108 in accordance with an embodiment of the present invention. Client 108 includes a client database 502, a sync engine 504, a hash engine 506, a commit module 508, a file transfer module 510, a list engine 512 and a file events engine 514. The operation of each of these modules is described further below.

Synchronizing a New File

Figure 6:
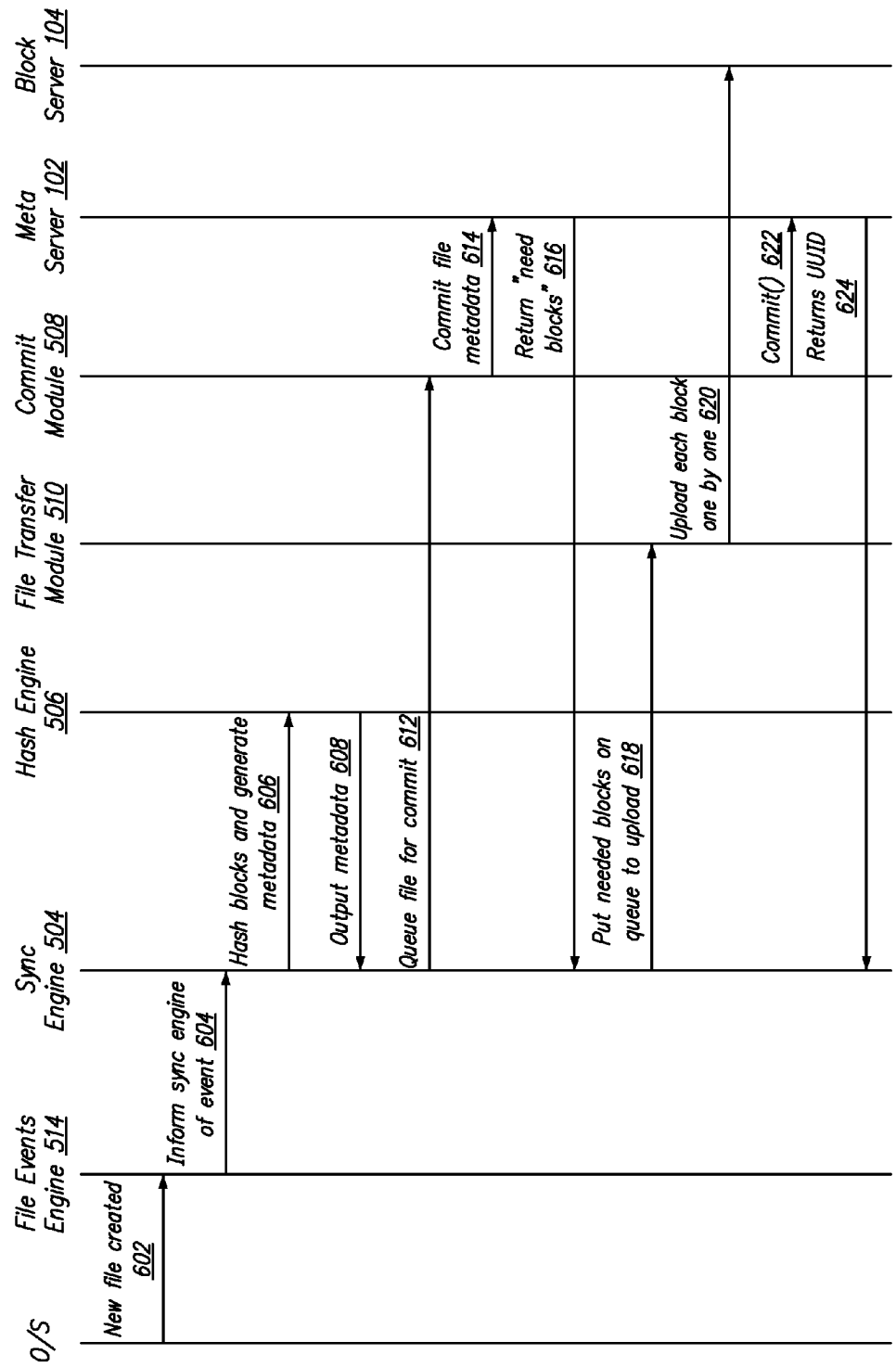
FIG. 6 is an interaction diagram illustrating synchronization of a new folder in accordance with an embodiment of the present invention.

For purposes of illustration, and with reference to FIG. 6, we first consider the situation in which a user adds a new file to a synchronized folder. File events engine 514 monitors the state of files in the synchronized folder to detect new files, modified files, and removed files. In various embodiments, the operating system sends 602 a message to file events engine 514 indicating that a change has occurred to the synchronized folder. In alternative embodiments, file events engine 514 identifies changes by, for example, comparing attributes of files in the folder on a periodic basis. Upon determining that a change has occurred to the synchronized folder, file events engine 514 informs 604 synchronization engine 504 that a change has been detected, and the location (path) of the folder or file within the folder where the change has occurred. In this case, the change to the folder is the addition of a new file.

Figure 7:
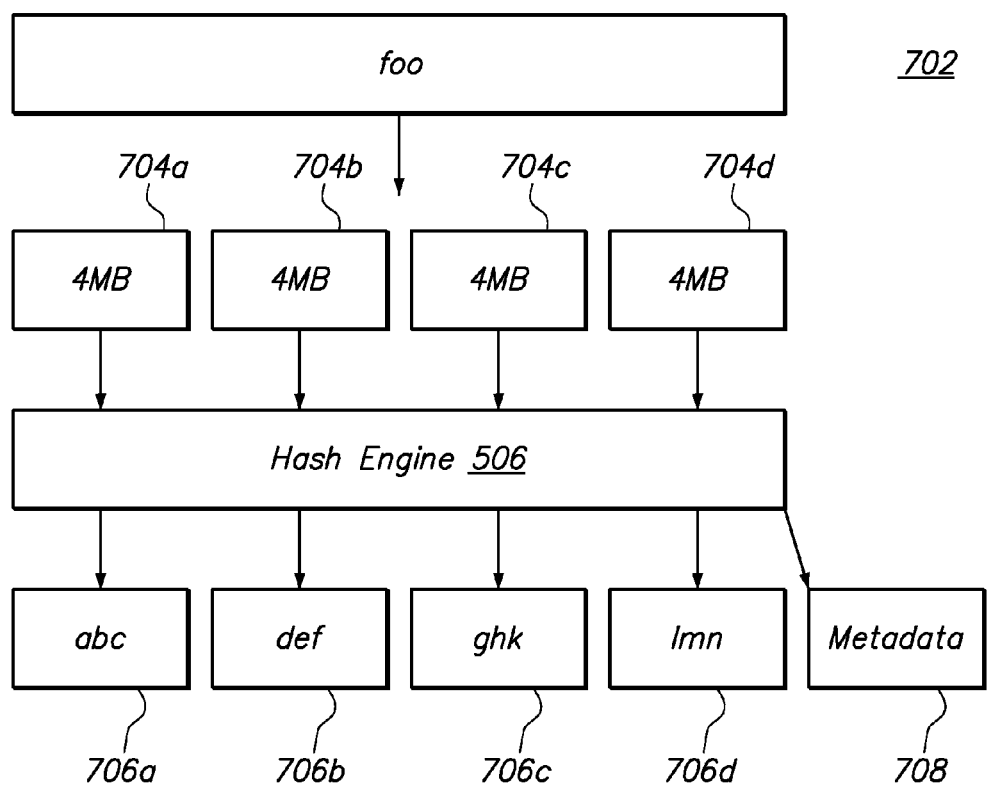
FIG. 7 illustrates a grouping and hashing process for files in accordance with an embodiment of the present invention.

In various embodiments, and referring now to FIG. 7, synchronized files 702 are grouped into fixed-sized blocks 704*a*, 704*b*, 704*c*, 704*d*. The block sizes may be, for example, 2 MB, 4 MB, etc., according to the preference of the implementer. After sync engine 504 is informed by file events engine 514 that a change has occurred, sync engine 504 instructs 606 (FIG. 6) hash engine 506 to create a hash of blocks 706*a*, 706*b*, 706*c*, 706*d*. Hash engine 506 hashes each of the blocks in the file using any of a variety of known hashing algorithms, which in one embodiment is the SHA256 function. A particular version of file 702 can be identified as a concatenation of the hashes of its blocks, referred to as a block list. In the illustrated case, for example, the block list for this version of file 702 is (abc,def,ghk,lmn). In addition, hash engine 506 also creates metadata 708 related to the changed file, including its path, modification time, size, whether it is a directory, and file attributes including, for example, permission settings. Hash engine 506 then returns 608 the metadata and block list to sync engine 504.

Continuing with FIG. 6, sync engine 504 next provides 612 the metadata to commit module 508, and commit module 508 issues 614 a commit command, which includes the metadata 708, to metadata server 102. Since the file is new and therefore being synchronized for the first time, metadata server 102 has no record of the blocks in the block list associated with the file 702. Metadata server 102 responds 616 to commit module 508 with a message, for example, "need blocks (abc,def,ghk,lmn)," indicating that host system 110 requires the blocks identified in the block list. Sync engine 504 instructs 618 file transfer module 510 to transfer the needed blocks, and file transfer module 510 adds the blocks to a queue of blocks to be transferred to block server 104 when a connection is opened. In one embodiment, each block and its associated hash value is transferred 620 to block server 104, and block server 104 uses the received hash as a check value by computing a hash of the received blocks. File transfer module 510 then informs sync engine 504 that the blocks have been successfully transferred, and block server 104 informs metadata server 102 of the blocks that have been received.

Once the needed blocks have been transferred, sync engine 504 instructs 622 commit module 508 to reissue the commit command to metadata server 502. Metadata server 502 recognizes that block server 504 now has the blocks listed in the block list of the metadata 708, and accepts the metadata 708, keeping a record of it. Metadata server 102 returns 624 to commit module 508 a unique ID (UUID) associated with the version of the file 702 specified by the metadata 708.

Modifying a Synchronized File

Figure 8:
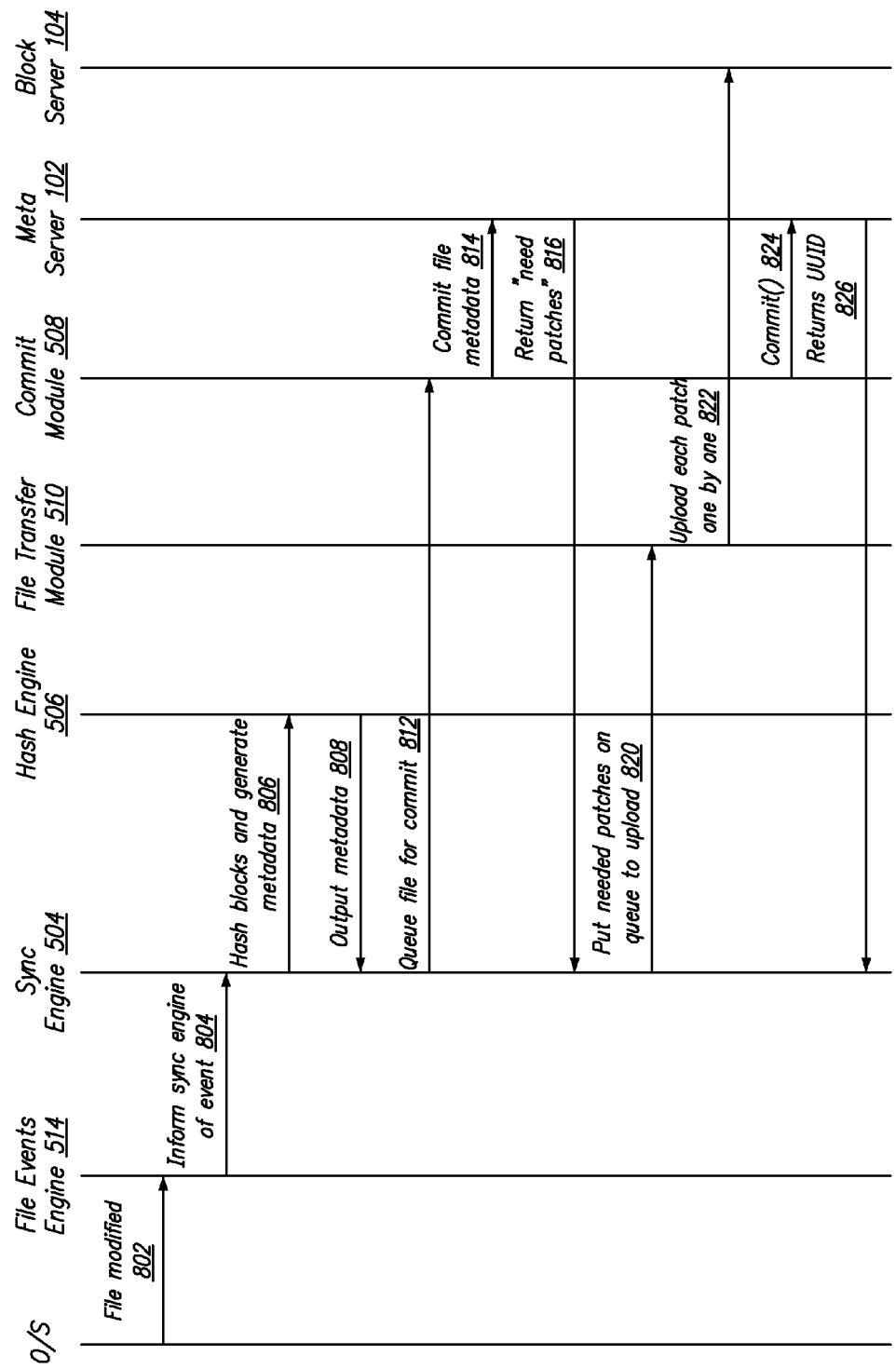
FIG. 8 is an interaction diagram illustrating synchronization of a modified folder in accordance with an embodiment of the present invention.

FIG. 8 is an interaction diagram illustrating synchronization of a modified file in accordance with an embodiment of the present invention. File events engine 514 receives 802 a notification from the operating system indicating that a change has occurred to the synchronized folder. In alternative embodiments, file events engine 514 identifies changes by, for example, comparing attributes of files in the folder on a periodic basis. Upon determining that a change has occurred to the synchronized folder, file events engine 514 informs 804 synchronization engine 504 that a change has been detected, and the path of the folder or file within the folder where the change has occurred.

Sync engine 504 then instructs 806 hash engine 506 to create a hash of blocks 706*a*, 706*b*, 706*c*, 706*d*. Hash engine 506 hashes each of the blocks in the changed file, resulting in a block list. In addition, hash engine 506 also creates other metadata 708 as described above. Hash engine 506 then returns 808 the hashed blocks and metadata including the block list to sync engine 504.

Next, sync engine 504 provides 812 the metadata to commit module 508, and commit module 508 issues 814 a commit command to metadata server 102. In one embodiment, the data provided by commit module 508 to metadata server 102 includes the modification time, the block list of the updated files as well as the block list of the previous version of the file, which is known as the parent block list. Assuming the new blocks have not yet been seen by block server 104, metadata server 102 asks 816 client 108 to provide the missing blocks. Sync engine 504 generates a patch for each new block that can be applied to its parent block, and instructs 820 file transfer module 510 to transfer those patches. A patch can be created using multiple methods known to those of skill in the art, for example including rsync. File transfer module 510 adds the patches to a queue of blocks to be transferred to block server 104 when a connection is opened. In one embodiment, each patch and its associated hash value is transferred 822 to block server 104, and block server 104 uses the received hash as a check value by computing a hash of the received blocks. File transfer module 510 then informs sync engine 504 that the patches have been successfully transferred, and block server 104 informs metadata server 102 of the blocks that have been received.

Once the needed blocks have been transferred, sync engine 504 instructs 824 commit module 508 to reissue the commit command to metadata server 502. Metadata server 502 recognizes that block server 504 has the blocks listed in the block list of the metadata 708, and accepts the metadata 708, keeping a record of it. Metadata server 102 returns 826 to commit module 508 a unique ID (UUID) associated with the version of the file 702 specified by the metadata 708.

Synchronizing Across Multiple Clients

As described above, a client 108 with a synchronized folder informs host system 110 when a file in a synchronized folder has been added, modified or deleted. Other clients may also have versions of the same synchronized folder, which are updated via host system 110 as follows.

Referring again to FIG. 1, assume that a user of a first client 108a has created a folder and invited a user of client 108b to share the folder. The folder is immediately synchronized on host system 110 as described above. In addition, both client 108a and client 108b are noted by notification server 106 as being associated with that folder. In one embodiment, each of the clients registers with notification server 106; in alternative embodiments notification server is informed by metadata server 102 or by the originating client 108a of the sharing relationship.

When metadata server 102 receives and successfully executes a commit instruction, notification server 106 in one embodiment informs all clients subscribed to that folder that the folder contents have changed. In an alternative embodiment, the client that initiated the change is not informed of the change.

Upon receiving the notification, each client 108 sends a list request to metadata server 102, and in response receives file metadata for all files in subscribed folders. The client then examines the block list for each file and identifies any listed blocks that the client does not already have in its database 502. File transfer module 510 then asks block server 104 for a patch from the parent block the client is in possession of to the new block the client needs. Block server 104 creates the patch and provides it to client 108 in response to the request. Client 108 then applies the patch to the parent block to obtain the updated block, which it then stores. Client 108 repeats the process for each block that needs updating. At the conclusion of the process, the client's version of the file is synchronized with the updated version on host system 110.

In one embodiment, clients maintain an open network connection to notification server 106. Where an open connection is not possible or feasible, the connection is kept alive as much as practical, and reestablished as necessary.

Conflict Detection

Figure 9:
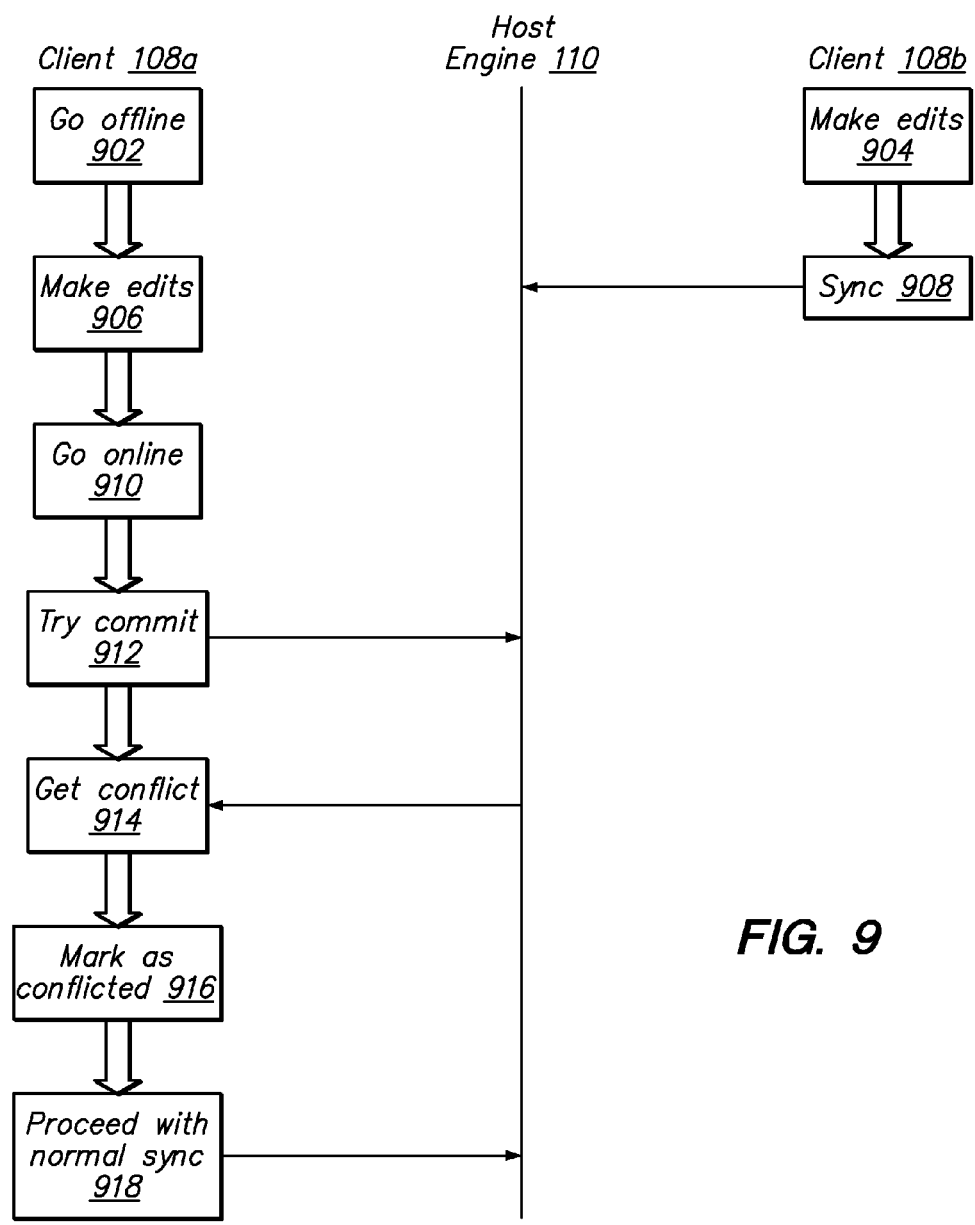
FIG. 9 is an interaction diagram illustrating conflict resolution during synchronization of a shared folder in accordance with an embodiment of the present invention.

FIG. 9 is an interaction diagram illustrating conflict detection in accordance with an embodiment of the present invention. A conflict can arise if, for example, two clients 108a and 108b are sharing a synchronized folder, and one or both of the clients becomes disconnected from the network linking them to host system 110. This may occur quite easily if a laptop is taken on the road, for example. Assume that client 108b remains connected to the network while client 108a goes offline 902. At that moment, each of the clients have identical versions of files in synchronized folders, and identical associated metadata, including block lists for the files. Now, users of both clients make revisions 904, 906 to their local versions of a file in a shared folder. Since client 108b is connected to the network, her changes will be immediately synchronized 908 with host system 110. The commit instruction sent from her client to metadata server 102 includes the appropriate parent block list as well as the new block list for each changed file. Changes made by the user of client 108a, however, will not be synchronized while he is offline.

When client 108a reestablishes a connection 910 to host system 110, his client's commit module 508 will attempt to commit the changes made while offline. However, because the version now current at host system 110 has been updated in the interim, the parent block list sent by commit module 508 will not match the parent block list on metadata server 102. Consequently, commit module 508 will reject the commit instruction, and instead return an error 914 to client 108a indicating that a conflict has occurred and a more recent version of the file is available. In one embodiment, a backup copy of the version as edited by the offline user is saved 916 on the client 108a and/or host system 110, and the client 108a then synchronizes 918 its version of the file with the later version available from host system 110.

File Deletions

In one embodiment, any client 108 that is sharing a synchronized folder can delete any file or subfolder in the folder, regardless of who created the folder. In an alternative embodiment, only the creator of a file or folder can delete it. In one embodiment, when a file is deleted, host system a14 maintains a copy of the file and its metadata for a certain amount of time, e.g., an hour, a day, a week, etc., and any client 108 may undelete the file, restoring to its previous location in the shared folder.

When a file is deleted, in one embodiment client commit module 508 issues a commit command to metadata server 102 that in one embodiment includes a commit instruction and the parent block list, with no new blocks to be added. Metadata server 102 then changes the attributes of the file to indicate its deleted status, and notification server 106 updates any subscribing clients. In some embodiments where deleted files are not maintained once deleted, metadata server 102 instructs block server 104 to delete the blocks in the deleted file's block list. To restore a file, client 108 issues a list command with a flag indicating a request for all available deleted files to metadata server 102. Metadata server 102 responds with a list of deleted files that are still available to be restored. Commit module 508 then issues a restore command, and metadata server 102 changes the attribute of the delete file to indicate it is no longer deleted. Notification server 106 then issues an update to clients sharing the folder to which the restored file belongs.

In one embodiment, system 100 enables multiple versions of a single synchronized file to be reviewed. In a manner similar to that described above with respect to file deletions, when a new version of a file is synchronized with metadata server 102, metadata server 102 maintains the metadata and block list for the previous version of the file. The blocks remain stored on block server 104, and upon instruction from a user of a client 108, metadata server 102 instructs block server 104 to provide a file consisting of the blocks in the previous version. This enables a user to preview an earlier version, and if desired, to restore it to the current version, in which case metadata server 102 simply updates the current version to reflect the block list of the version being restored.

Mapping Namespaces

In one embodiment, host system 110 performs namespace mapping functions, allowing users of system 100 to interact seamlessly with shared folders through their operating system's standard user interface. Assume a first user has a folder that is synchronized with host system 110. Referring to FIG. 10, the "My Dropbox" folder 1002 is such a folder. In one embodiment, the synchronized folder 1002 exists in a first name space, which for purposes of example we will refer to as "1:". In the example of FIG. 10, the folders Music, Patent Applications, Photos, and Public, and the document Getting Started.rtf are each stored also in namespace 1:. Note also that the "My Dropbox" folder 1002 in the illustrated embodiment is displayed next to other conventional folders such as "My Meetings", "My Received Files," and others.

Assume now that the user indicates that he wishes to share the "Patent Applications" folder. In one embodiment, a user can indicate this through a user interface command, such as by right-clicking on the folder name and selecting a "Share This Folder . . . " option 1102, as illustrated in FIG. 11. Alternatively, the user can use a web interface to communicate the share instructions to host system 110. In either event, the user also specifies the account identifier of the user(s) with whom the folder is to be shared.

Metadata server 102 receives the share instruction and moves the subfolder "Patent Applications" from the path "1:/Patent Applications" to a new namespace, which we will call "2:". Metadata server 102 then creates a mapping from the namespace "1:/Patent Applications" to the namespace "2:", and instructs the client to do the same. Note that from the point of view of the user, nothing appears to have changed in the user interface.

Assume now that the invited user has an existing namespace, "3:". Assuming the user accepts the invitation to share the folder, metadata server 102 creates a link in the 3: namespace, such that "3:/Patent Applications" points to namespace 2:. Metadata server 102 also adds the invited user's identifier to the list of users sharing the folder, and notification server 106 begins providing change notifications to the invited user's client. The invited user's client then obtains the latest version of the synchronized file according to the methods described above.

At some point, either the client who initiated the sharing of the synchronized folder, or any of the clients who subscribed to the shared folder may decide to end the sharing arrangement. At that time, metadata server 102 removes the namespace mappings initiated when the share with that client was created. In the example above, if the invited user decided to stop sharing the folder, then the link from "3:/Patent Applications" to namespace 2: would be removed. If the original user were to disable sharing for the folder, then any invited users would be unlinked from the folder as just described. In one embodiment, the folder remains in namespace 2: and the mapping from namespace "1:/Patent Applications" to namespace 2: remains intact. In an alternative embodiment, the folder is returned to its original location in namespace 1:.

As noted, client 108 may be executed on a computer system with various operating systems, including Microsoft Windows, Mac OS, Linux, and mobile operating systems such as Apple iOS. Where folders are shared, the sharing need not be between clients running on the same operating system. For example, client 108a may be hosted by a Mac OS operating system while client 108b is on a system running Microsoft Windows.

A single user may have multiple computers, each of which may or may not be running the same operating system. Using system 100, the user can maintain documents and files in a synchronized folder, and have the contents of that folder available to him regardless of which of his computers and at which location he happens to be at the moment he needs them, without having to worry about which version is available on which computer.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored on a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for synchronizing a shared folder over a network, the method comprising:
   receiving a first file and an associated first block list at a host system from a first client system;
   associating the received file with a synchronized folder on the host system, the synchronized folder having an associated first namespace and the folder including a plurality of files, each of the plurality of files having an associated block list;
   receiving a request from the first client system to share the synchronized folder with a second client system;
   associating the synchronized folder with a second namespace;
   associating the synchronized folder with the second client system;
   receiving a request from the second client system for contents of the synchronized folder;
   providing to the second client system a link from a third namespace to the second namespace, and an indication of each of the plurality of files and its associated block list in the synchronized folder;
   receiving at the host system a request from the second client system for the first file, the request including blocks identified in the provided first block list;
   providing the first file including the requested blocks to the second client system;
   receiving at the host system from the first client system a modification to the first file;
   updating the first file and its associated first block list according to the received modification;
   providing an indication to the second client system that the contents of the folder have changed, the indication including the first block list and the updated block list associated with the first file;
   receiving a request from the second client system for the modification to the first file; and
   sending, by the host system, a difference between the blocks in the updated block list and the first block list.

2. The method of claim 1 wherein each block identified in the first block list is a hash of a portion of the first file.

3. The method of claim 1 further comprising:
   providing an indication to a third client system that the contents of the folder have changed, the indication including the first and the updated first block list associated with the first file;
   receiving a request from the third client system for the modification to the first file;
   and
   sending, by the host system to the third client system the difference between the blocks in the updated first block list and the first block list.

4. The method of claim 1 further comprising:
   receiving, by a notification server at the host system, a request from a plurality of additional client systems to be notified of modifications to the synchronized folder;
   informing, by the host system, the plurality of additional client systems that the first file has been modified;
   receiving, by the host system from at least one of the plurality of additional clients, a request for one of the blocks in the updated first block list, the request also identifying at least one of the blocks in the first block list;
   determining, by a block server, a difference between the identified first block and the requested updated first block; and
   sending, by the block server to the additional client, the determined difference between the identified first block and the requested updated first block.

5. A computer program product for synchronizing a folder across a computer network, the computer program product stored on a non-transitory computer readable medium and including instructions that when loaded into memory cause a computer processor to carry out the steps of:
   receiving a first file and an associated first block list at a host system from a first client system;
   associating the received file with a synchronized folder on the host system, the synchronized folder having an associated first namespace and the folder including a plurality of files, each of the plurality of files having an associated block list;
   receiving a request from the first client system to share the synchronized folder with a second client system;
   associating the synchronized folder with a second namespace;
   associating the synchronized folder with the second client system;
   receiving a request from the second client system for contents of the synchronized folder;
   providing to the second client system a link from a third namespace to the second namespace, and an indication of each of the plurality of files and its associated block list in the synchronized folder;

receiving at the host system a request from the second client system for the first file, the request including blocks identified in the provided first block list;

providing the first file including the requested blocks to the second client system;

receiving at the host system from the first client system a modification to the first file;

updating the first file and its associated first block list according to the received modification;

providing an indication to the second client system that the contents of the folder have changed, the indication including the first block list and the updated block list associated with the first file;

receiving a request from the second client system for the modification to the first file; and sending, by the host system, a difference between the blocks in the updated block list and the first block list.

6. The computer program product of claim 5 wherein the instructions further cause the processor to carry out the steps of:

providing an indication to a third client system that the contents of the folder have changed, the indication including the first and the updated first block list associated with the first file;

receiving a request from the third client system for the modification to the first file;

and sending, by the host system to the third client system the difference between the blocks in the updated first block list and the first block list.

7. The computer program product of claim 5 wherein the instructions further cause the processor to carry out the steps of:

receiving, by a notification server at the host system, a request from a plurality of additional client systems to be notified of modifications to the synchronized folder;

informing, by the host system, the plurality of additional client systems that the first file has been modified;

receiving, by the host system from at least one of the plurality of additional clients, a request for one of the blocks in the updated first block list, the request also identifying at least one of the blocks in the first block list;

determining, by a block server, a difference between the identified first block and the requested updated first block; and sending, by the block server to the additional client, the determined difference between the identified first block and the requested updated first block.

8. The computer program product of claim 5 wherein each block identified in the first block list is a hash of a portion of the first file.

* * * * *